(No Model.)
H. B. SHERMAN.
HOSE BAND CLAMP.
No. 427,709. Patented May 13, 1890.
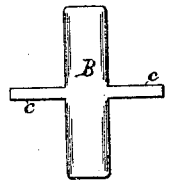
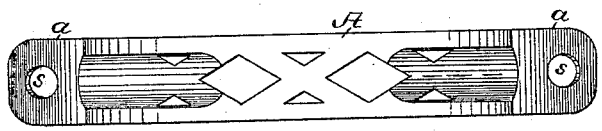
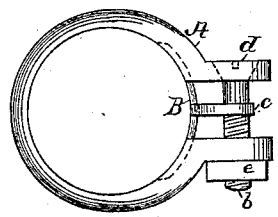
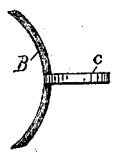
WITNESSES
Mrs. R. Shettler
Niles H. Wirant
INVENTOR
Howard B. Sherman

UNITED STATES PATENT OFFICE.

HOWARD B. SHERMAN, OF BATTLE CREEK, MICHIGAN.

HOSE BAND-CLAMP.

SPECIFICATION forming part of Letters Patent No. 427,709, dated May 13, 1890.

Application filed May 7, 1889. Serial No. 309,954. (No model.)

*To all whom it may concern:*

Be it known that I, HOWARD B. SHERMAN, a citizen of the United States, residing at Battle Creek, in the county of Calhoun and State of Michigan, have invented a new and useful Hose Band-Clamp, of which the following is a specification.

My invention relates to improvements in a hose band-clamp in which a band is circularly formed, but not closed, with ends bent up forming lugs relatively opposite, these lugs having circular openings similarly situated to receive a bolt, which, acting in conjunction with a nut, draws the clamp together; and the objects of my improvements are, first, to obtain a clamp of sufficient stiffness without waste of material; second, to allow the clamp to set closer to the hose than is attainable with the above-described style of clamp, and, third, to provide means for completing and forming a true circle. I attain these objects by the mechanism illustrated in the accompanying drawings, in which—

Figure I is a side view of the clamp proper, Fig. II a bottom view, and Fig. III a side elevation. Fig. IV is a bottom view of saddle attachment, and Fig. V a side elevation.

Similar letters refer to similar parts throughout the several views.

The band A and the lugs $a$ $a$ of Fig. II constitute the clamp proper.

B in Fig. IV is the saddle attachment, which is bent up to form an arc of the same circle of which A is a portion, as shown in Figs. III and V. The clamp proper, as shown in Fig. II, takes the form of Fig. III when bent up. The short grooves, as in Fig. II, begin at the extremity of junction of $a$ $a$ with A, and extend for a short distance on inner side of A, ending in a gradual taper.

Fig. III shows the application of the saddle attachment (after it is bent, as in Fig. V) to the clamp proper, Fig. II, (after it is also formed up to fit the size hose for which it is intended,) the grooves receiving the ends of B, which are rounded to a good fit, while the opposite extensions $c$ $c$ from B bend up over the bolt $b$, securing the attachment firmly to the hose-clamp proper, thus forming and completing a uniform circle.

The fretwork of the band portion of the clamp, as shown in Fig. II, readily allows the hose, when the clamp is drawn together, to adjust itself by rising into these openings, thereby giving the clamp a securer grip to the hose. This fretwork has also the advantage of lessening the amount of material without detracting from the strength and stiffness of the clamp. The lug that receives the head of bolt is countersunk, while the other lug against which the nut rests is plain.

I do not claim as my invention the clamp proper, the use of bolt, nor countersunk lug; but What I do claim as my invention, and desire to secure by Letters Patent, is—

1. The hose band-clamp described, consisting of the band A, forming substantially a complete circle, and having lugs at each end and formed upon its inner face with depressions and grooves adjacent to said lugs, the saddle-piece in the form of a cross, formed with a curved portion fitting said grooves, and with bendable extensions arranged between and parallel with the lugs, the bolt passed through openings in said lugs and provided with a nut $e$, the said extension being bent around the bolt, substantially as shown and described.

2. As an improved article of manufacture, a saddle-piece for hose band-clamps, having the general form of a cross, with a curved portion, and arms $c$, extending therefrom in opposite directions from opposite sides and adapted to be bent, substantially as shown and described.

HOWARD B. SHERMAN.

Witnesses:
NELSON E. HUBBARD,
J. C. REYNOLDS.